United States Patent [19]

Brandeberry et al.

[11] 4,209,556
[45] Jun. 24, 1980

[54] METHOD OF PROCESSING GLAZED TUBULAR INSERTS

[75] Inventors: Raymond L. Brandeberry; Lawrence B. Ginther, both of Toledo; Glen J. Lehr, Oregon; Paul F. Sanford, Toledo, all of Ohio

[73] Assignee: Libbey-Owens-Ford Company, Toledo, Ohio

[21] Appl. No.: 967,527

[22] Filed: Dec. 8, 1978

Related U.S. Application Data

[63] Continuation-in-part of Ser. No. 849,780, Nov. 3, 1976, abandoned.

[51] Int. Cl.² ............................................. B05D 3/00
[52] U.S. Cl. ................................... 427/330; 427/242; 427/295; 427/327; 427/377; 427/376.4
[58] Field of Search .............. 427/295, 242, 330, 193, 427/327, 375, 376 C, 377

[56] References Cited

U.S. PATENT DOCUMENTS

| | | | |
|---|---|---|---|
| 2,339,392 | 1/1944 | Garner | 427/295 X |
| 2,378,588 | 6/1945 | Skehan et al. | 427/242 X |
| 2,603,577 | 7/1952 | Eckel | 427/330 X |
| 2,886,463 | 5/1959 | Liest | 427/330 |
| 3,013,892 | 12/1961 | Songas | 427/242 |
| 3,027,607 | 4/1962 | Badger et al. | 427/193 X |
| 3,141,753 | 7/1964 | Certa | 427/330 X |
| 3,557,400 | 1/1971 | Arendt et al. | 52/304 X |
| 3,574,584 | 4/1971 | Girard et al. | 427/193 X |
| 3,748,170 | 7/1973 | Michael | 427/330 X |
| 3,906,125 | 9/1975 | Uher | 427/330 |

Primary Examiner—Shrive P. Beck
Attorney, Agent, or Firm—Collins, Oberlin & Darr

[57] ABSTRACT

Method for processing glass coated tubular metal inserts for use in forming apertures employed in the manufacture of all-glass multiple sheet glazing units. The surface of the metal inserts are first cleaned and then their outer surfaces are prepared to receive a layer of glass frit by tumbling in sand. The layer of glass frit is physically adhered to the clean outer surface by tumbling the inserts in small pieces of glass. The glass fritted inserts are then treated in a continuous operation, at elevated temperatures by first degassing the glass frit layers in a vacuum, oxidizing the outer surface of the metal inserts at a temperature below the sintering temperature of the glass frit in a controlled atmosphere, and then sintering and glazing the glass frit layer at a temperature above the softening point thereof while still in a controlled atmosphere to securely bond the glass layer to the metal inserts.

11 Claims, 6 Drawing Figures

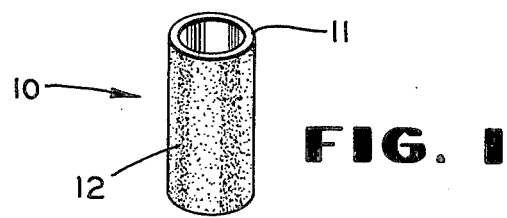
FIG. 1
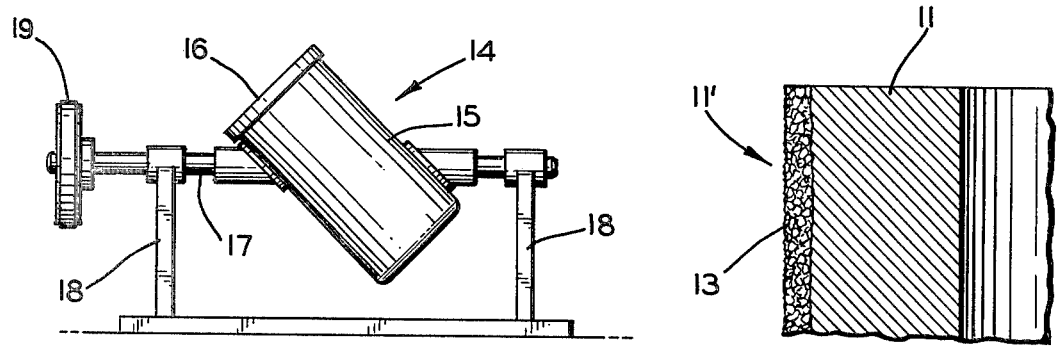
FIG. 2   FIG. 3
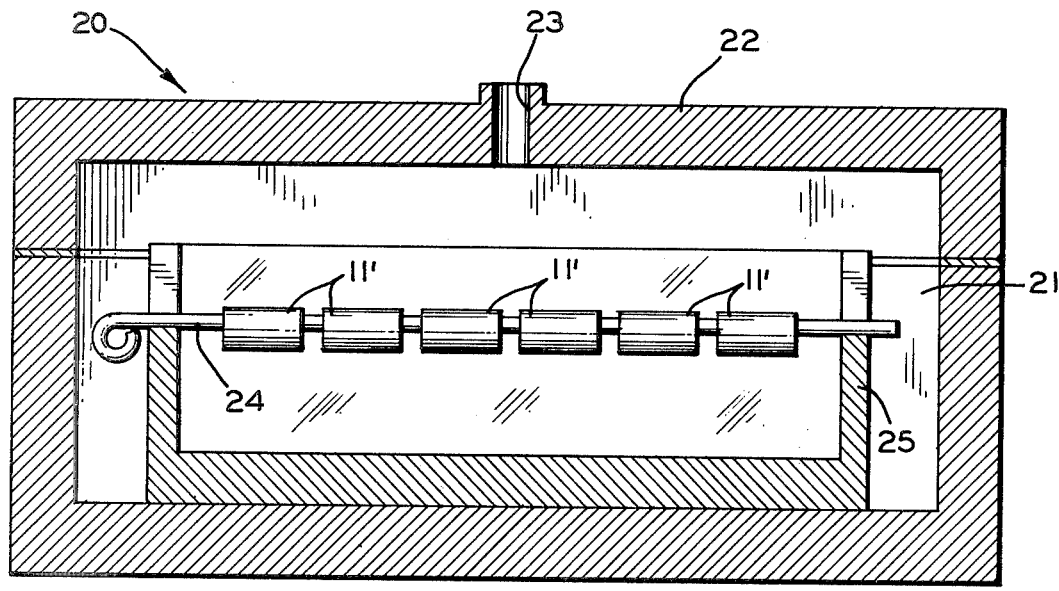
FIG. 4
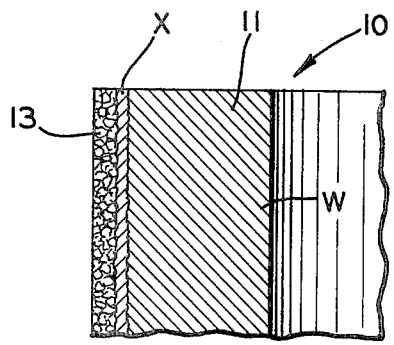   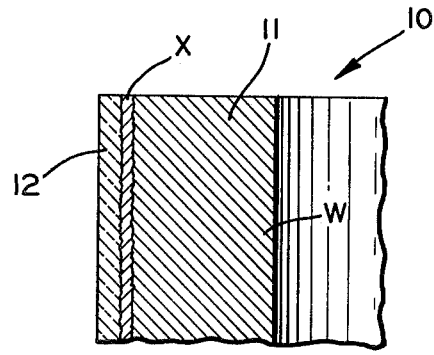
FIG. 5   FIG. 6

METHOD OF PROCESSING GLAZED TUBULAR INSERTS

CROSS REFERENCE TO RELATED APPLICATION

This is a continuation-in-part of applicants' prior co-pending application Ser. No. 849,780, filed on Nov. 3, 1977 and now abandoned.

BACKGROUND OF THE INVENTION

1. Field of the Invention

This invention generally relates to all-glass multiple sheet glazing units and more particularly to an improved method for processing the tubular metal inserts used to form apertures, opening into the interior thereof.

2. Description of the Prior Art

As is known, one form of multiple sheet glazing unit generally comprises two sheets of glass in spaced face-to-face parallel relation having their peripheral edge portions fused together to form a continuous fused edge wall around the periphery of each of the units. The air space formed between the two sheets of glass is dehydrated or purged through at least one tubular metal insert which is sealed into the fused edge wall of the units during their fabrication and, following purging, the tubular metal insert is plugged to hermetically seal the air space to provide the desired insulating and condensation preventing quality of such units.

In the past, as disclosed in U.S. Pat. Nos. 3,027,607 issued on Apr. 3, 1962 and 3,557,400 issued on Jan. 26, 1971, the tubular metal inserts have been coated with a layer of glass having the same composition as the glass sheets forming the glazing units in an effort to form a satisfactory seal between the inserts and the glass sheets. Also these patents disclose that it is important in order to maintain a suitable sealing relationship that the thermal expansion characteristics of the tubular metal inserts closely approximate those of the glass sheets.

However, it has been found that when glass produced by the float process is used for the frit coating on the metallic insert, the glazed glass layer does not securely bond to the surface of the metallic insert and the glass layer contains significant amounts of gas. Accordingly, during the edge fusing operation of the glazing units significant amounts of gas evolve from the layer of glass on the metal inserts. The gas evolved during assembly of the coated inserts into the fused edges of the glass sheets causes foaming to occur between their interfaces, thereby producing an ineffective seal. It is believed, for some reason not known to applicants, that the amount of gas evolvement from the glazed inserts is due to the method of producing the glass; that is, glass which has been produced by the float process and glass which has been produced by the sheet or window process. In other words, it appears that the amount of gas evolved from the glazed glass inserts is dependent upon the glass used in glazing the inserts, its melting, refining and manufacturing history as well as its composition.

While the procedures disclosed in the above-mentioned patents have proven effective in applying a glass coating to the surface of the metal inserts in the past from frit produced from sheet glass, they have not proven satisfactory in providing a glass coating from frit produced from float glass in that such coatings will not form a hermetic seal between the interfaces of the inserts and the fused edge of the glazing unit because of the gaseous occlusions therein. It has been discovered that the fusing of a layer of glass produced by either aforementioned process, on the inserts to the glass sheet of the glazing units can be improved by the novel procedures of this invention with respect to gaseous occlusions in the glass layer, bonding of the glass layer on the metal insert, and resistance of the glass layer to deterioration during storage prior to use, i.e. their exposure to temperature and humidity conditions over a period of time.

SUMMARY OF THE INVENTION

Briefly, the novel steps of processing the tubular metal inserts contemplated by this invention overcome the above-mentioned objections by providing a continuous three-step operation at elevated temperatures wherein the glass frit layer physically adhered to a tubular metal insert is degassed in a vacuum, followed in succession by providing a layer of oxide of the metal on the tubular insert is formed below the sintering temperature of the glass frit layer and sintering and glazing the glass frit layer, the last two steps being performed in a controlled atmosphere.

OBJECTS AND ADVANTAGES

An object of this invention is to provide an improved tubular insert used in forming an aperture in all-glass multiple sheet glazing units for forming a hermetic seal between the interfaces of the insert and the fused edges of the glazing units.

Another object of this invention is to provide a novel method of processing tubular metal inserts including degassing of the glass frit layer in a vacuum for eliminating gaseous occlusions therein, and between it and the glass sheets during manufacture of all-glass multiple sheet glazing units.

Yet another object of this invention is to provide a procedure for processing of the metal inserts wherein the vacuum degassing, the oxidizing and glazing thereof is a continuous operation.

A further object of this invention is to provide a process for oxidizing the underlying surface of the metallic insert under controlled conditions for achieving uniformity of the bond between the glaze and the metallic insert.

Other objects and advantages will become more apparent during the course of the following description when taken in connection with the accompanying drawing.

BRIEF DESCRIPTION OF THE DRAWING

In the drawing, wherein like numerals are employed to designate like parts throughout the same:

FIG. 1 is a perspective view of a tubular metal insert used in the formation of an aperture employed in the manufacture of an all-glass multiple sheet glazing unit;

FIG. 2 is a side elevational view of a tumbling device in which the outer surfaces of the metal inserts physically receive an impacted layer of glass particles;

FIG. 3 is an enlarged fragmentary, cross-sectional view showing the wall of a metal insert with a layer of glass frit physically impacted thereon;

FIG. 4 is a diagrammatic view of a vacuum furnace for degassing the layer of glass frit adhered on the tubular metal inserts;

FIG. 5 is a cross-sectional view similar to FIG. 3, but showing the wall of the metal insert provided with an oxide layer and a glazed glass layer; and FIG. 6 is a cross-sectional view similar to FIGS. 3 and 5, but showing the glass layer on the metal insert after it has been glazed.

DESCRIPTION OF THE PREFERRED EMBODIMENT

Referring now to the drawing and particularly to FIG. 1, there is illustrated a glass coated tubular metal insert indicated generally by the reference numeral 10, used in an all-glass multiple sheet glazing unit (not shown) which has been produced by the novel process of the present invention. The tubular insert 10 generally comprises a metal tubular member 11 having a glazed layer of glass 12 free of gaseous occlusions, bonded thereto. The hollow interior of the member 11 provides the necessary access opening to the interior of the glazing unit which may be closed by a body of solder (not shown) in order to hermetically seal the interior of the glazing unit.

It is recognized in the teachings of U.S. Pat. Nos. 3,027,607 and 3,557,400 that the tubular metal member 11 can be formed from certain metals, or alloys of such metals, having thermal expansion characteristics compatible with those of the glass sheets of the glazing unit. By the way of example, metal members 11 of nickel-iron and nickel-iron-cobalt alloys have been satisfactorily employed. The tubular members 11 are prepared for use in the glazing unit by first cleaning them and then preparing their outer surfaces to physically receive a layer of glass frit 13. Also, it is recognized that best results can be obtained in sealing the inserts 10 in the all-glass units when the glazed glass layer 12, bonded on the metal tube 11, is of the same composition as the glass sheets employed in the glazing units.

Initial treatment of the metal tube 11 is, of course, required to properly prepare the outer surface thereof before the glass frit layer 13 is applied. Such treatment includes conventionally known procedures to thoroughly clean the surfaces of the metal tubes, removal of foreign particles therefrom, and "heat-soaking" the members 11 to decarborize the metal thereof. In addition to the pretreatment steps set forth in the aforementioned patents, it has been discovered that when the tubular members 11 are tumbled in a body of sand, an improved and uniform matte finish will be provided resulting in an improved physical bond between the surfaces thereof and the powdered glass frit layer 13 (see FIG. 3).

One form of a tumbling apparatus that may be employed to tumble the tubular inserts in sand is illustrated in FIG. 2, and consists of a ball mill 14 having a cylindrical chamber 15 open at one end and over which opening a removable cover 16 is tightly fitted. The chamber 15 is mounted on a rotary shaft 17 and diagonally disposed relative thereto. The ends of the shaft 17 are journalled in a pair of upstanding posts 18 and the shaft is rotated by a pulley 19 driven by a motor (not shown). Rotation of the shaft 17 tumbles and agitates the contents in the chamber 15 thus providing a continuous impacting of the tubular members 11 by the sand.

Following the initial cleaning treatment, the layer of glass frit 13 (see FIG. 3) is physically applied on the outer surface of the tubular members. A preferred method of applying the glass frit layer 13 on the members 11 is by tumbling the members 11 in a tumbling apparatus such as the aforedescribed ball mill 14, with small pieces of glass of the desired composition. After the glass pieces and tubular members 11 have been tumbled together for a period of time, the glass pieces will pulverize and the tubular members 11 will be found to have been completely coated with a finely powdered layer of glass frit 13 on the outer surfaces thereof.

Such a coating method has been described in the aforementioned patents and includes the steps of: (1) filling the chamber of a tumbling apparatus about half full of small particles of solid glass of suitable composition; (2) adding a quantity of tubular members 11 into the chamber 15 and tumbling for a period of time, i.e. about five hours; and (3) screening out the powdered glass frit coated tubular members 11.

After the tubular members 11 have been physically coated with the layer of glass frit 13 and removed from the ball mill 14 this invention contemplates heating the coated tubular members 11' in a manner to remove any gaseous occlusions from the layer of glass frit 13. This degassing process may be accomplished by introducing the coated tubular members 11' into a vacuum furnace 20 (see FIG. 4) and heating them to a temperature below the sintering temperature of the glass frit layer 13 for a period of time sufficient to remove any dissolved or absorbed gases from the body and surfaces of the finely divided frit layer 13. In this step it is important that the degassing temperature not reach a level where the glass layer 13 begins to sinter.

Referring now to FIG. 4, one suitable form of the vacuum furnace 20 may consist of a chamber 21 open at one end and over which opening a removable cover 22 is tightly fitted. The cover 22 may be provided with an inlet port 23 which is connected to a vacuum pump (not shown) for evacuating the chamber 21. This step can be carried out by stringing a quantity of the coated tubular members 11' on a wire 24, supporting a quantity of the strung wires in a rack 25 and placing the rack 25 in the chamber 21 of the vacuum furnace 20. It has been found that a satisfactory degassing of the powdered glass frit layer 13 is obtained by operating the furnace 20 with a vacuum pressure of twenty microns (0.020 mm) of pressure in mercury (Hg) (Absolute) at a temperature level of 1050° F. (566° C.) for a period of about three (3) hours. However, it should be noted that these parameters of pressure, temperature, and time may be varied as long as no sintering of the powdered glass layer 13 occurs.

After the degassing step, the glass frit coated tubular members 11' are heated in an oxidizing atmosphere to produce a layer of oxide of the metal on the outer surface of the insert 11. It is recognized that, as described in U.S. Pat. No. 3,557,400, the metal oxide layer acts to improve the wetting and overall bonding of a sintered glass frit layer 12 to the surface of a metallic tubular member. It has been discovered that an improved bond between the glass frit layer 12 and the metallic tubular member 11 is obtained by developing an oxide layer on the surface of the member without sintering the powdered glass frit layer 13. Thus, as illustrated in FIG. 5 the outer surface of the wall w of the tubular member 11 is provided with a layer x of the oxide of the metal to which is adhered the powdered glass frit layer 13. Now, to obtain the benefits of the layer of metal oxide x care must be exercised to insure that it will not be so thick as to spall or so thin that the subsequent operations, such as glazing of the powdered glass frit or fusing the glazed insert 10 into the multiple sheet glazing unit will dissolve it. A desired thickness of the oxide layer x can be obtained by heating the degassed frit coated tubular insert 11' at an elevated temperature in a controlled or synthetic atmosphere, at atmospheric pressure, and heating the coated members 11 at the elevated temperature for a period of time. In this step then it is important that the oxidizing temperature not reach a level where the powdered glass layer 13 begins to sinter.

In accordance therewith, the vacuum pressure in the chamber 21 is released and an oxygen-nitrogen atmosphere at atmospheric pressure is introduced therein through the inlet port 23. It has been found that a suitable oxide layer x can be formed on the surface of the tubular member 11 in an atmosphere ranging from as little as two percent (2%) oxygen ($O_2$) and ninety-eight percent (98%) nitrogen ($N_2$) to twenty percent (20%) oxygen and eighty percent (80%) nitrogen. In both cases the temperature in the furnace chamber 21 is raised to about 1180° F. (638° C.) for a time period of about forty-five (45) minutes to produce an oxide layer x of desired thickness on the surface of the metal insert 11. The parameters of the synthetic atmosphere, temperature and time are not critical as long as the metal oxide layer x is not so thick as to spall but yet thick enough to form a good bond between the interfaces of the glass frit layer 13 and the tubular member 11.

In order to sinter the glass frit layer 13 on the tubular member 11 and provide it with a satisfactory glaze under conditions that will effectively prevent loss of the metal oxide layer x, this invention contemplates a further heating step under an inert or a slightly oxidizing atmosphere. Accordingly, the oxygen-nitrogen atmosphere in the vacuum furnace 20 may be replaced with a pure dry nitrogen atmosphere or a nitrogen atmosphere having an oxygen content of about two or three tenths percent (0.2 to 0.3%. The temperature in the furnace is raised to range extending between 1350° F. to 1550° F. (732° C.–816° C.) and the processed inserts are heated for about one-half hour (½) hour or until a complete glazing of the glass layer 12 takes place; that is, until the glass frit layer 13 turns into a layer of hard glass 12. Preferably, the glazed inserts 10 are cooled in the furnace to a reduced temperature level of about 500° F. (260° C.) before the furnace atmosphere is released.

It is believed that the glazed metal inserts 10 produced by the steps of this invention achieve its superior bonding and sealing properties by eliminating all the dissolved and absorbed gases from the powdered glass frit 13 and providing an improved bonding surface between the frit and the metallic tubular member 11 prior to the sintering and glazing of the glass frit layer 13 so that upon subsequent reheating when the inserts 10 are to be installed into an all-glass multiple glazing unit, no frothing or foaming between them occurs.

It is to be understood that the form of the invention herewith shown and described is to be taken as an illustrative embodiment only of the same, and that various changes in the parameters and arrangements of the steps may be resorted to without departing from the spirit of the invention.

We claim:

1. A method for processing tubular metal inserts of the type having a layer of glass frit physically adhered to their outer surface for use in forming apertures in all-glass multiple sheet glazing units, comprising the steps of heating the frit coated metal inserts in a vacuum to a temperature sufficient to remove any dissolved and absorbed gases from the layer of glass frit physically adhered thereto, heating the coated, degassed metal inserts in an oxygen-inert gas atmosphere to a temperature below the sintering temperature of the glass frit which is sufficient to develop a layer of metallic oxide on the surface of the metal inserts without sintering the glass frit layer, and heating the frit coated metal inserts at an elevated temperature in an inert atomsphere to sinter and glaze the layer of glass frit without destroying the layer of metallic oxide.

2. A method of processing coated tubular metal inserts as claimed in claim 1, wherein the layer of glass frit is degassed in a vacuum of about 20 microns of mercury absolute.

3. A method for processing coated tubular metal inserts as claimed in claim 1, including the step of initially impacting the outer surface of said metal inserts with particles of glass to provide the surface of the metal inserts with said layer of finely divided glass frit physically adhered thereto.

4. A method for processing tubular metal inserts as claimed in claim 3, including the step of impacting the metal inserts with particles of sand before said impacting with glass particles to prepare the surfaces of the inserts for physically receiving the layers of glass frit.

5. A method for processing tubular metal inserts as claimed in claim 1, wherein said metal inserts and the impacted layer of glass frit physically adhered thereto are heated to a temperature of about 1050° F. (566° C.) for a period of about three (3) hours in a vacuum of about twenty (20) microns of mercury absolute for degassing the layer of glass frit.

6. A method for processing tubular metal inserts as claimed in claim 1, wherein said metal inserts and the layer of glass frit physically adhered thereto are heated to a temperature of about 1180° F. (638° C.) for a period of about forty-five (45) minutes in a controlled oxygen-inert gas atmosphere for forming a layer of oxide on the metal inserts.

7. A method for processing tubular metal inserts as claimed in claim 6, wherein said controlled oxygen-inert gas atmosphere ranges from a mixture of 2% oxygen and 98% nitrogen to 20% oxygen and 80% nitrogen.

8. A method for processing tubular metal inserts as claimed in claim 1, wherein said coated metal inserts are heated at an elevated temperature ranging from about 1350° F. to 1550° F. (732° C. to 816° C.) in an inert atmosphere for about one-half (½) hour to form a glazed glass coating on the metal inserts.

9. A method for processing tubular metal inserts as claimed in claim 8, wherein said inert atmosphere for sintering and glazing is pure dry nitrogen.

10. A method for processing tubular metal inserts as claimed in claim 8, wherein said inert atmosphere for sintering and glazing is slightly oxidizing comprising about 0.2 to 0.3% oxygen with the balance pure nitrogen.

11. A method for processing tubular metal inserts as claimed in claim 1, including the step of cooling the glazed metal inserts to a temperature of about 500° F. (260° C.) prior to releasing said inert atmosphere.

* * * * *

UNITED STATES PATENT AND TRADEMARK OFFICE
CERTIFICATE OF CORRECTION

PATENT NO. : 4,209,556
DATED : June 24, 1980
INVENTOR(S) : Raymond L. Brandeberry et al It is certified that error appears in the above-identified patent and that said Letters Patent are hereby corrected as shown below:

Col. 3, line 34, after "all-glass" insert --glazing--

Col. 5, line 35, "or" should be --to--

Signed and Sealed this

Thirtieth Day of September 1980

[SEAL]

Attest:

SIDNEY A. DIAMOND

Attesting Officer

Commissioner of Patents and Trademarks